DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 454

T905,012
METHOD FOR DEVELOPING DIAZOTYPE ELEMENTS

Rex J. Hsu and Delbert D. Reynolds, both of Kodak Park Works, Rochester, N.Y. 14650

Filed Apr. 13, 1972, Ser. No. 243,817
**Int. Cl. G03c *1/58***
U.S. Cl. 96—49
No Drawing. 15 Pages Specification

Nearly instantaneous processing of two-component diazotype elements is achieved by contacting the sensitized surface of the diazotype element, after imagewise exposure to radiation, with an amine liberated from an amine carbamate salt by heating. Image development can be carried out by bringing the diazotype element into contact with vapors formed from the amine carbamate salt by heating or by bringing the diazotype element into contact with the salt in solid form or in the form of a solution and heating to liberate the amine. The amine carbamate salts which are useful include those derived from alkyl amines, cycloalkyl amines, aralkyl amines and heterocyclic amines. An example of a salt providing particularly good results is α-methylbenzylamine carbamate α-methylbenzylamine salt. When employed in solution form, the amine carbamate salts are preferably dissolved in an alcohol and can be applied to the diazotype element by techniques such as brushing, swabbing, dipping, spraying, wick application and roller application. Solid amine carbamate salts can be utilized in powder form or in the form of a shaped object such as a block or roller. Heating at temperatures of from about 40° C. to about 150° C. and more preferably about 80° C. to about 120° C. provides a dense dye image of good quality.